United States Patent
Posch et al.

(10) Patent No.: US 10,843,745 B2
(45) Date of Patent: Nov. 24, 2020

(54) MOTOR VEHICLE

(71) Applicant: Dr. Ing. h.c. F. Porsche Aktiengesellschaft, Stuttgart (DE)

(72) Inventors: Tobias Posch, Wimsheim (DE); Alberto Areal-Salve, Stuttgart (DE); Riccardo Bauer, Owen (DE)

(73) Assignee: Dr. Ing. h.c. F. Porsche Aktiengesllschaft, Stuttgart (DE)

( * ) Notice: Subject to any disclaimer, the term of this patent is extended or adjusted under 35 U.S.C. 154(b) by 71 days.

(21) Appl. No.: 16/139,138

(22) Filed: Sep. 24, 2018

(65) Prior Publication Data
US 2019/0111977 A1   Apr. 18, 2019

(30) Foreign Application Priority Data

Oct. 17, 2017   (DE) .................. 10 2017 124 089

(51) Int. Cl.
*B62D 27/06* (2006.01)
*B62D 35/00* (2006.01)
*B62D 65/02* (2006.01)

(52) U.S. Cl.
CPC ......... *B62D 27/065* (2013.01); *B62D 35/007* (2013.01); *B62D 65/02* (2013.01)

(58) Field of Classification Search
CPC .... B62D 27/065; B62D 35/007; B62D 65/02; B60J 5/107
See application file for complete search history.

(56) References Cited

U.S. PATENT DOCUMENTS

2017/0282981 A1   10/2017   Leterrier

FOREIGN PATENT DOCUMENTS

| DE | 3333092 A1 | 3/1985 |
| DE | 102009058388 A1 | 6/2011 |
| DE | 102009060868 A1 | 7/2011 |
| WO | WO-2016016578 A1 * | 2/2016 ................ B60J 1/18 |

* cited by examiner

*Primary Examiner* — D Glenn Dayoan
*Assistant Examiner* — Melissa Ann Bonifazi
(74) *Attorney, Agent, or Firm* — Leydig, Voit & Mayer, Ltd.

(57) ABSTRACT

A motor vehicle includes a supporting structure, a first component, fastened to the supporting structure, that forms a first part of an outer skin, a second component, fastened to the supporting structure, that forms an adjacent second part of the outer skin, and a setting element positioned in a defined manner relative to the second component and fastened at a gauged position of the first component.

12 Claims, 2 Drawing Sheets

MOTOR VEHICLE

CROSS REFERENCE TO RELATED APPLICATION

This application claims benefit to German Patent Application No. DE 10 2017 124 089.6, filed Oct. 17, 2017, which is hereby incorporated by reference herein.

FIELD

The invention relates to a motor vehicle having a supporting structure to which there are fastened a first component, which forms a first part of an outer skin, and a second component, which forms an adjacent second part of the outer skin. The invention furthermore relates to a method for installing components, which form parts of an outer skin, on a supporting structure of a motor vehicle of said type.

BACKGROUND

The German laid-open specification DE 10 2009 060 868 A1 has disclosed a connecting arrangement for connecting a rear spoiler of a motor vehicle to a sub-structure of the motor vehicle, wherein the rear spoiler runs, in its longitudinal extent, transversely with respect to the vehicle longitudinal axis, wherein the connecting arrangement comprises at least one fastening device, wherein, by manually loosening or tightening at least one component of the fastening device, a relative change in spacing and/or change in position of the rear spoiler in relation to the sub-structure can be performed, wherein the fastening device comprises at least one fastening bolt, a setting plate and a combination element, wherein the combination element is composed of a combination nut and a combination disk. The German laid-open specification DE 10 2009 058 388 A1 has disclosed a setting element for the fastening of a first component to a second component, wherein the setting element comprises a sleeve and a threaded bolt, the sleeve can be screwed with its external thread into an internal thread of the second component, and the threaded bolt which extends through the sleeve is supported on one side on the sleeve and at the other side on the first component, wherein the clear width of the sleeve is greater than the radial extent of the threaded bolt, wherein, on the free end of the threaded bolt, there is provided a thread section for engaging into an internal thread provided on the first component, wherein the threaded bolt has a head section which, at an end side, is supported on the sleeve at the section which projects on the inner side of the second component.

SUMMARY

In an embodiment, the present invention provides a motor vehicle. The motor vehicle includes a supporting structure; a first component, fastened to the supporting structure, that forms a first part of an outer skin; a second component, fastened to the supporting structure, that forms an adjacent second part of the outer skin; and a setting element positioned in a defined manner relative to the second component and fastened at a gauged position of the first component.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
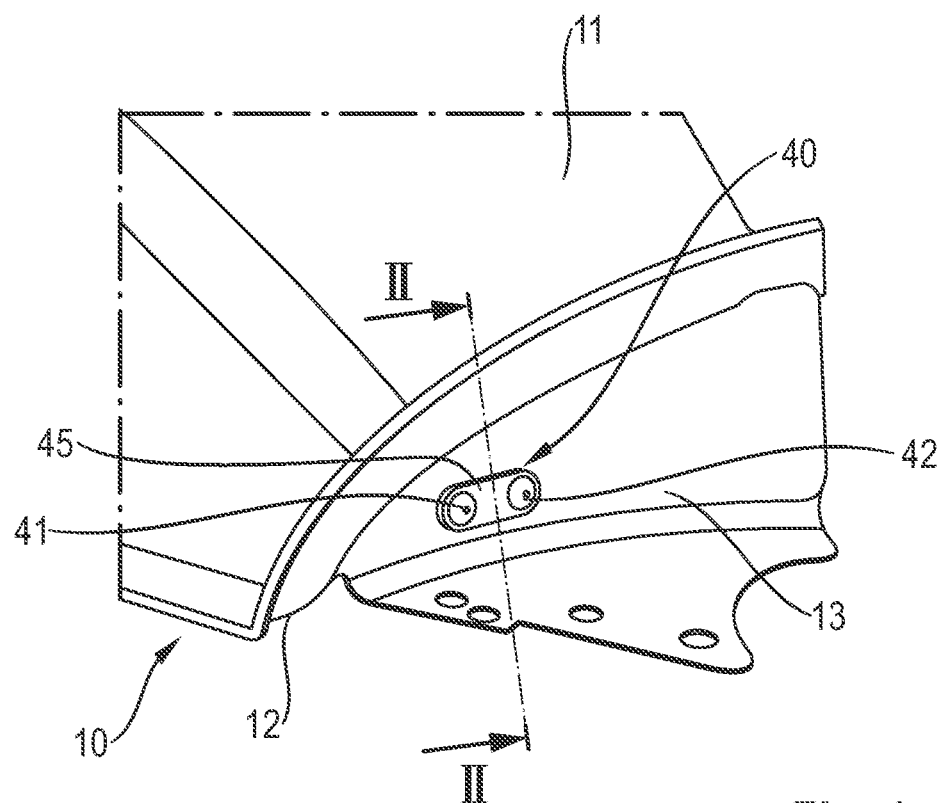
FIG. 1 is a perspective illustration of a first component, which forms a first part of an outer skin of a motor vehicle, without a second component, which forms an adjacent, second part of the outer skin of the motor vehicle.

Embodiments of the invention avoid an undesired offset on a motor vehicle having a supporting structure to which there are fastened a first component, which forms a first part of an outer skin, and a second component, which forms an adjacent second part of the outer skin.

Embodiments of the invention provide motor vehicles having a supporting structure to which there are fastened a first component, which forms a first part of an outer skin, and a second component, which forms an adjacent second part of the outer skin, in which a setting element which is positioned in a defined manner relative to the second component is fastened at a gauged position of the first component. With the setting element, it is possible in a simple manner for a desired joint dimension between the two components to be set. The supporting structure of the motor vehicle is also referred to as bodyshell, or part of the bodyshell, of the motor vehicle. Owing to component tolerances of the bodyshell, an offset may arise between the bodyshell and adjacent components. To reduce the offset, the setting element is gauged in the bodyshell. This gauged setting element advantageously serves as a holder for one or more adjoining components.

A preferred exemplary embodiment of a motor vehicle is characterized in that the setting element is gauged in a z direction relative to a surface of the first part of the outer skin. A vehicle longitudinal direction is also referred to as x direction. A vehicle transverse direction is also referred to as y direction. A z direction or z axis of the motor vehicle is perpendicular to a plane which is spanned by the x direction or x axis and the y direction or y axis. During the gauging of the setting element in the z direction, the setting element is, using a suitable gauge, positioned and fastened with a defined spacing in the z direction to the surface of the first outer skin.

A further preferred exemplary embodiment of a motor vehicle is characterized in that the setting element has a fastening body with two slots spaced apart transversely with respect to a z direction. The slots advantageously extend substantially in a z direction. With the slots, a setting range of for example plus/minus 1.5 millimeters in the z direction is realized. The setting range is advantageously large enough that the occurring manufacturing tolerances can be compensated by means of the setting element.

A further preferred exemplary embodiment of a motor vehicle is characterized in that the setting element has, between the slots, a positioning peg which engages into a complementary positioning recess in the second component in order to position the second component in a defined manner in the z direction relative to the first component. Here, for example, the first component is firstly fastened to the supporting structure or to the bodyshell. Subsequently, the second component is then fastened to the supporting structure or to the bodyshell. Here, manufacturing tolerances may give rise to the above-described undesired offset. By means of the interaction of the positioning peg with the positioning recess, the undesired offset can be reliably avoided in a simple manner. The positioning peg has for example the form of a straight circular cylinder. The positioning recess has for example substantially the form of a circle, the inner diameter of which approximately corresponds, possibly with a sufficient positioning clearance, to the outer diameter of the positioning peg. This provides the advantage that the second component with the positioning recess is easily fitted onto the positioning peg of the first component in order to position the two components relative to one another without an offset.

A further preferred exemplary embodiment of a motor vehicle is characterized in that the positioning recess is formed into the second component with a defined spacing, in the z direction, relative to a surface of the second part of the outer skin. The positioning recess is for example milled into the second component at a desired position in the z direction by a manufacturer of the second component. Here, the positioning recess is advantageously spaced apart from the surface of the second outer skin in the z direction to such an extent that neither the positioning peg nor the positioning recess are visible from the outside in the installed state.

A further preferred exemplary embodiment of a motor vehicle is characterized in that the first part of the outer skin is formed on a side part. The side part is preferably a rear side part, in particular a rear fender, of the motor vehicle. In a further exemplary embodiment, the rear side part is fixedly connected to a panel elongation, which serves for forming a sealing channel. The fixed connection between the side part and the panel elongation is realized for example as a rivet connection. Alternatively or in addition, the fixed connection may be of cohesive design.

A further preferred exemplary embodiment of a motor vehicle is characterized in that the second part of the outer skin is formed on a lower shell of an air-guiding device. The air-guiding device advantageously comprises an air-guiding element designed as a rear spoiler or rear wing. The air-guiding element is advantageously deployable by means of a suitable drive device and adjustable in terms of its inclination by means of a suitable adjustment device.

In methods according to embodiments of the invention for installing components, which form parts of an outer skin, on a supporting structure of a motor vehicle as described above, a positioning recess can be formed into the second component with a defined spacing, in a z direction, relative to a surface of the second part of the outer skin. The positioning recess is advantageously formed into the second component, for example by milling, independently of the assembly of the motor vehicle. This provides the advantage that the positioning recess can be formed into the second component, for example by milling, by a supplier.

A preferred exemplary embodiment of a method is characterized in that the setting element is fastened at the gauged position of the first component before the second component is positioned with its positioning recess on the positioning peg of the setting element fastened to the first component. Offset-free installation of the two components on the supporting structure of the motor vehicle is thereby made possible in a simple manner.

Embodiments of the invention further provide a setting element, a first component and/or a second component for a motor vehicle as described above. The stated parts are marketable separately.

Figure 2:
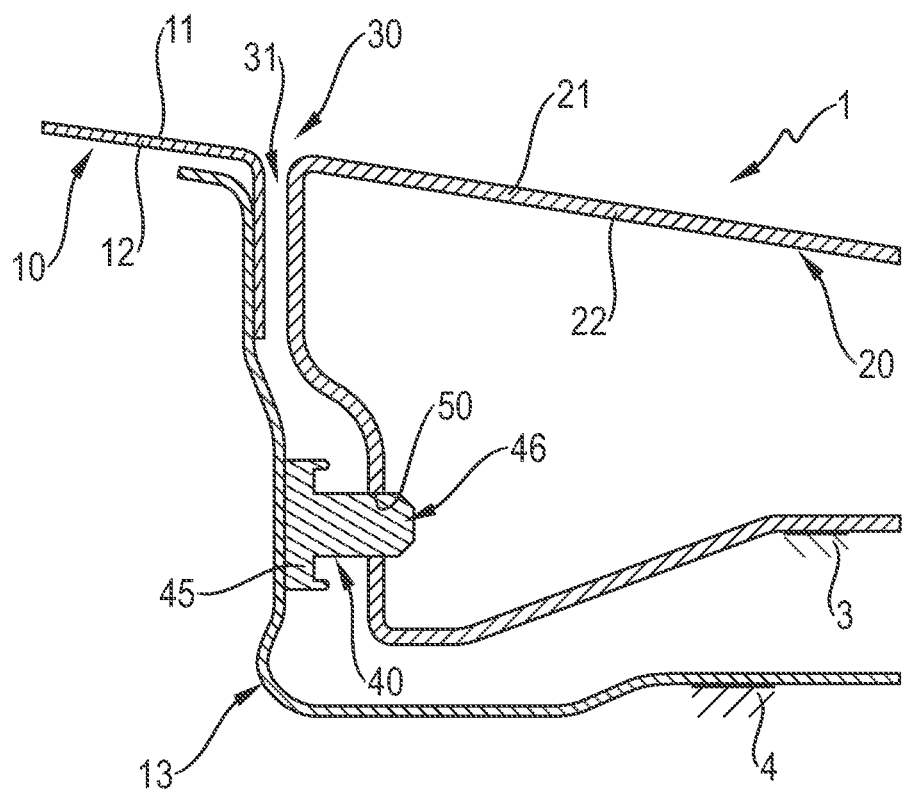
FIG. 2 shows a section along the line II-II in FIG. 1 through both components.

FIGS. 1 to 5 illustrate a part of a rear end of a motor vehicle 1 in various views. The motor vehicle 1 comprises a supporting structure, which is indicated in FIG. 2 by designations 3, 4, and which is also referred to as bodyshell of the motor vehicle 1.

A first component 10 is illustrated in a perspective view in FIG. 1. The first component 10 serves for realizing a first part 11 of an outer skin of the motor vehicle. The first component 10 comprises a side part 12. The side part 12 is a rear side part, in particular a rear fender, of the motor vehicle.

The first component 10 furthermore comprises a panel elongation 13. The panel elongation 13 serves for realizing a sealing channel, and is connected fixedly, for example with the aid of rivet connections, to the rear side part 12.

FIG. 2 illustrates a section along the line II-II in FIG. 1. In the illustrated section, it can be seen that a second component 20 constitutes a second part 21, adjacent to the first part 11, of the outer skin of the motor vehicle 1. The second component 20 comprises a lower shell 22 of an air-guiding device (not illustrated). The air-guiding device is preferably a deployable rear spoiler or rear wing which is adjustable in terms of its inclination.

A joint 31 is formed between the two components 10, 20 in a visible region 30. An offset in a z direction, that is to say upward or downward in FIG. 2, between the two components 10, 20, in particular between the two parts 11, 21 of the outer skin of the motor vehicle 1, is undesirable for visual reasons. To avoid this undesired offset, a setting element 40 is arranged between the two components 10, 20.

The setting element 40 is fastened by means of two fastening screws 41, 42 to the panel elongation 13 of the first component 10. For the fastening of the setting element 40, it is advantageous for corresponding threaded bores to be provided in the panel elongation 13.

The setting element 40 comprises a fastening body 45 with two slots through which the fastening screws 41, 42 extend. The slots are spaced apart from one another transversely with respect to the z direction. Furthermore, the slots extend in the z direction in order to compensate manufacturing-induced tolerances of the first component 10 after the fastening thereof to the supporting structure 4.

A positioning peg 46 extends, to the right in FIG. 2, from the fastening body 45. The positioning peg 46 engages into a positioning recess 50 which is provided in the lower shell 22 of the second component 20. The positioning recess 50 is designed for example as a circular through hole in the lower shell 22.

Figure 3:
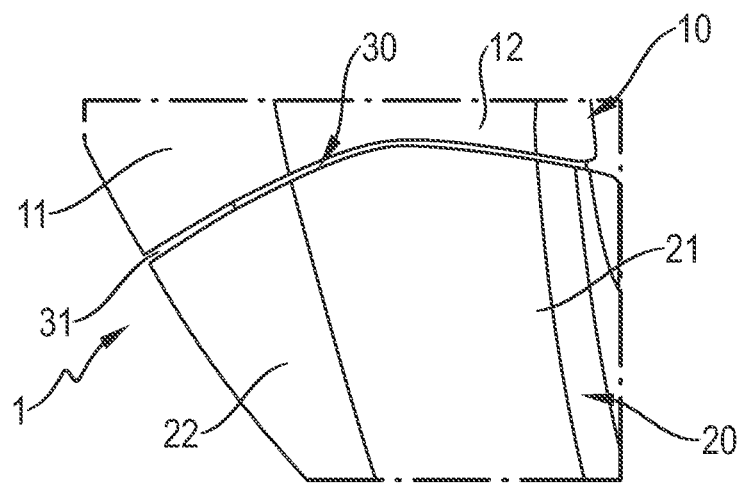
FIG. 3 shows the two components from FIG. 2 in a plan view of the outer skin of the motor vehicle.

FIG. 3 illustrates how the two components 10, 20 are positioned relative to one another without an offset. Here, the fastening of the two components 10, 20 is realized at different points of the supporting structure. The setting element 40 with the positioning peg (46 in FIG. 2) advantageously serves for compensating manufacturing tolerances of the two components 10, 20 during or after the fastening thereof to the supporting structure 3, 4 of the motor vehicle 1.

Figure 4:
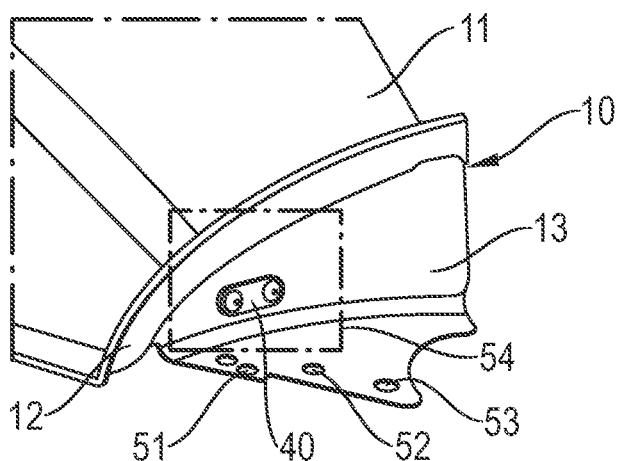
FIG. 4 shows the first component from FIG. 1 with a rectangle for illustrating a gauging process of a setting element on the first component.

It is indicated in FIG. 4 that firstly the first component 10 is fastened to the supporting structure of the motor vehicle 1. For this purpose, the panel elongation 13 has three through holes 51, 52 and 53. Suitable fastening screws can be screwed through the through holes 51 to 53 into the supporting structure, situated therebelow, of the motor vehicle 1 in order to fixedly connect the first component 10 to the supporting structure. The setting element 40 is thereafter then gauged on the first component 10, as indicated in FIG. 4 by a rectangle 54.

Figure 5:
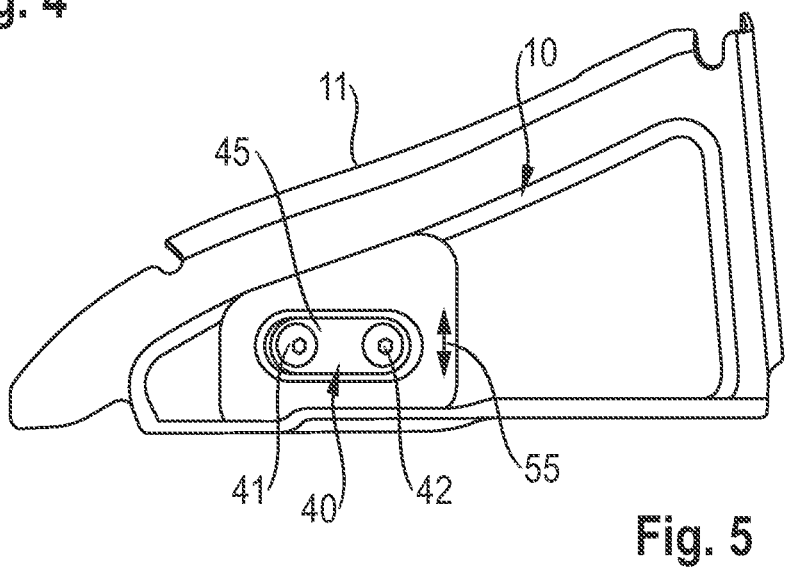
FIG. 5 shows the component from FIG. 4 with the setting element in the plan view.

In FIG. 5, it is indicated by means of a double arrow 55 how relative movements in the z direction between the first component 10 and the setting element 40 are made possible by means of the setting element 40 during the gauging process. Here, the setting element 40 may for example be adjusted by plus/minus 1.5 millimeters in the z direction relative to the first component 10 before the setting element 40 is fixedly connected to the first component 10 by tightening of the two fastening screws 41, 42.

The setting element 40 is screwed to or gauged on the bodyshell such that a defined dimension is realized in the z direction between the first part 11 of the outer skin and the positioning peg (46 in FIG. 2). In parallel with this, that is to say possibly before, after or at the same time as this, the positioning recess (50 in FIG. 2) is formed, in particular milled, into the second component 20. Here, the positioning recess 50 is arranged with a defined spacing in the z direction to the second part 21 of the outer skin.

After the fastening of the first component 10 to the supporting structure 4 of the motor vehicle 1, the second component 20 is then simply fitted with its positioning recess 50 onto the positioning peg 46 of the setting element 40. The second component 20 is then correctly positioned relative to the first component 10 and can be fixedly connected to the supporting structure 3. No further setting work is required for setting the joint dimension between the two components 10, 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle, comprising:
   a supporting structure;
   a first component, fastened to the supporting structure, that forms a first part of an outer skin;
   a second component, fastened to the supporting structure, that forms an adjacent second part of the outer skin; and
   a setting element positioned in a defined manner relative to the second component and fastened at a gauged position of the first component.

2. The motor vehicle as claimed in claim 1, wherein the setting element is gauged in a z direction relative to a surface of the first part of the outer skin.

3. The motor vehicle as claimed in claim 1, wherein the setting element has a fastening body with two slots spaced apart transversely with respect to a z direction.

4. The motor vehicle as claimed in claim 3, wherein the setting element has, between the slots, a positioning peg which engages into a complementary positioning recess in the second component in order to position the second component in a defined manner in the z direction relative to the first component.

5. The motor vehicle as claimed in claim 4, wherein the positioning recess is formed into the second component with a defined spacing, in the z direction, relative to a surface of the second part of the outer skin.

6. The motor vehicle as claimed in claim 1, wherein the first part of the outer skin is formed on a side part.

7. The motor vehicle as claimed in claim 1, wherein the second part of the outer skin is formed on a lower shell of an air-guiding device.

8. A method for installing components on a supporting structure of a motor vehicle as claimed in claim 4, the method comprising:
   forming a positioning recess into the second component with a defined spacing, in a z direction, relative to a surface of the second part of the outer skin.

9. The method as claimed in claim 8, wherein the setting element is fastened at the gauged position of the first component before the second component is positioned with its positioning recess on the positioning peg of the setting element fastened to the first component.

10. A setting element, a first component and/or a second component for a motor vehicle as claimed in claim 1.

11. The method as claimed in claim 9, the method comprising:
   fastening the first component to the supporting structure,
   using a gauge, gauging the setting element into the gauged position by adjusting a relative position of the setting element on the first component via slots within the setting element, and
   fixing the setting element at the gauged position.

12. The motor vehicle according to claim 1,
   wherein the first component has a panel elongation having a portion extending in a z direction, and
   wherein the setting element has a fastening body with two slots spaced apart transversely with respect to the z direction, wherein the setting element is adjustably fixable to the portion of the panel elongation extending in the z direction to orient the setting element into the gauged position.

* * * * *